US012792069B2

(12) United States Patent
Olson et al.

(10) Patent No.: US 12,792,069 B2
(45) Date of Patent: Nov. 10, 2026

(54) PRESSURE SENSING BLOWOUT PREVENTER CONTROL SYSTEM

(71) Applicant: Schlumberger Technology Corporation, Sugar Land, TX (US)

(72) Inventors: Matthew Olson, Cypress, TX (US); Brian Matteucci, Houston, TX (US); Suman Katanguri, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 769 days.

(21) Appl. No.: 18/176,038

(22) Filed: Feb. 28, 2023

(65) Prior Publication Data

US 2023/0205239 A1 Jun. 29, 2023

Related U.S. Application Data

(63) Continuation of application No. PCT/US2022/052215, filed on Dec. 8, 2022.
(Continued)

(51) Int. Cl.
*G05D 16/20* (2006.01)
*E21B 33/06* (2006.01)
(Continued)

(52) U.S. Cl.
CPC .......... *G05D 16/208* (2013.01); *E21B 33/06* (2013.01); *F15B 1/04* (2013.01); *F15B 7/10* (2013.01);
(Continued)

(58) Field of Classification Search
CPC ...... F15B 2211/205; F15B 2211/20576; F15B 2211/25; F15B 2211/251; F15B 2211/252;
(Continued)

(56) References Cited

U.S. PATENT DOCUMENTS 3,250,336 A 5/1966 Haeber
3,319,923 A 5/1967 Haeber
(Continued)

FOREIGN PATENT DOCUMENTS

CA 3045336 C 3/2021
CN 2844415 Y 12/2006
(Continued)

OTHER PUBLICATIONS

International Search Report and Written Opinion of International Application No. PCT/US2021/046199 dated Nov. 9, 2021, 13 pages.

(Continued)

*Primary Examiner* — Atif H Chaudry
(74) *Attorney, Agent, or Firm* — Kelly C. Brewerton

(57) ABSTRACT

A control system includes a closing unit including a tank including a usable volume of the control system, at least one primary pump configured to pump hydraulic fluid from the usable volume of the tank, a plurality of valves, and a first pressure transducer disposed between the at least one primary pump and at least one valve of the plurality of valves. The at least one primary pump, the pressure transducer, and the at least one valve of the plurality of valves are hydraulically connected with the tank. The first pressure transducer manages a start-stop operation of the at least one primary pump. Hydraulic fluid within the control system has a predetermined static pressure. The at least one pump is powered by an electric energy source.

20 Claims, 6 Drawing Sheets

Related U.S. Application Data

(60) Provisional application No. 63/265,099, filed on Dec. 8, 2021.

(51) Int. Cl.

| | |
|---|---|
| ***F15B 1/04*** | (2006.01) |
| ***F15B 7/10*** | (2006.01) |
| ***F15B 11/072*** | (2006.01) |
| ***F15B 15/20*** | (2006.01) |
| ***F15B 20/00*** | (2006.01) |

(52) U.S. Cl.
CPC ............ *F15B 11/072* (2013.01); *F15B 15/20* (2013.01); *F15B 20/004* (2013.01); *F15B 2211/205* (2013.01); *F15B 2211/25* (2013.01); *F15B 2211/251* (2013.01)

(58) Field of Classification Search
CPC .. F15B 20/004; F15B 2211/6653; F15B 7/10; F15B 11/072; G05D 16/208
See application file for complete search history.

(56) References Cited

U.S. PATENT DOCUMENTS

| | | | |
|---|---|---|---|
| 4,337,653 | A | 7/1982 | Chauffe |
| 4,614,148 | A | 9/1986 | Bates |
| 4,880,025 | A | 11/1989 | McMahan, Jr. |
| 5,070,904 | A | 12/1991 | McMahon, Jr. |
| 5,583,764 | A | 12/1996 | Nail |
| 5,838,589 | A | 11/1998 | Nail |
| 6,032,742 | A | 3/2000 | Tomlin |
| 6,484,806 | B2 | 11/2002 | Childers |
| 6,574,652 | B2 | 6/2003 | Burkhard |
| 6,659,200 | B1 | 12/2003 | Eppink |
| 7,261,162 | B2 | 8/2007 | Deans |
| 7,539,548 | B2 | 5/2009 | Dhawan |
| 7,576,447 | B2 | 8/2009 | Biester |
| 8,212,378 | B2 | 7/2012 | Biester |
| 8,393,399 | B2 | 3/2013 | Judge |
| 8,408,337 | B2 | 4/2013 | Livingstone |
| 8,555,976 | B2 | 10/2013 | Ebenezer |
| 8,789,606 | B1 | 7/2014 | Lugo |
| 9,019,118 | B2 | 4/2015 | Milne |
| 9,085,948 | B2 | 7/2015 | Egeland |
| 9,184,451 | B2 | 11/2015 | Bennett |
| 9,322,264 | B2 | 4/2016 | Gutierrez |
| 9,419,288 | B2 | 8/2016 | Wood |
| 9,494,007 | B2 | 11/2016 | Bourgeau et al. |
| 9,587,454 | B1 | 3/2017 | Beard |
| 9,658,130 | B2 | 5/2017 | Veeningen |
| 9,664,005 | B2 | 5/2017 | Babbitt |
| 9,759,033 | B2 | 9/2017 | Meraz |
| 9,797,216 | B2 | 10/2017 | Rosa |
| 9,822,600 | B2 | 11/2017 | Bourgeau et al. |
| 9,828,824 | B2 | 11/2017 | McAuley |
| 9,970,287 | B2 | 5/2018 | Jaffrey |
| 10,000,987 | B2 | 6/2018 | Springett |
| 10,048,673 | B2 | 8/2018 | Holmes |
| 10,196,871 | B2 | 2/2019 | Holmes |
| 10,202,839 | B2 | 2/2019 | Scott |
| 10,267,116 | B2 | 4/2019 | Babbitt |
| 10,316,605 | B2 | 6/2019 | Bourgeau et al. |
| 10,338,578 | B2 | 7/2019 | Thwaites |
| 10,408,641 | B2 | 9/2019 | Gaude |
| 10,428,625 | B2 | 10/2019 | Leslie |
| 10,539,010 | B2 | 1/2020 | Gutierrez |
| 10,648,301 | B2 | 5/2020 | Landi |
| 10,690,153 | B1 | 6/2020 | LeBlanc |
| 10,787,877 | B2 | 9/2020 | Pedersen |
| 10,788,543 | B2 | 9/2020 | Emerich |
| 10,801,292 | B2 | 10/2020 | Biester et al. |
| 10,876,369 | B2 | 12/2020 | Holmes |
| 10,883,357 | B1 | 1/2021 | Orbell |
| 10,907,436 | B2 | 2/2021 | Wood |
| 10,954,737 | B1 | 3/2021 | Nouh |
| 11,060,372 | B2 | 7/2021 | Bourgeau |
| 11,180,967 | B2 | 11/2021 | Pedersen |
| 11,187,052 | B2 | 11/2021 | Angstmann |
| 11,242,722 | B2 | 2/2022 | Buffarini |
| 11,274,520 | B2 | 3/2022 | Martin |
| 11,339,788 | B2 | 5/2022 | Babbitt |
| 11,441,579 | B2 | 9/2022 | Nault |
| 11,460,835 | B2 | 10/2022 | Dalton |
| 11,519,237 | B2 | 12/2022 | Holmes |
| 11,536,116 | B2 | 12/2022 | Olson |
| 11,542,771 | B2 | 1/2023 | Nouh |
| 11,555,372 | B1 | 1/2023 | Al-Mousa |
| 11,708,732 | B2 | 7/2023 | Collins |
| 12,129,730 | B2 | 10/2024 | Olson |
| 2005/0178586 | A1 | 8/2005 | Livingstone |
| 2011/0040465 | A1 * | 2/2011 | Suda ..................... B60T 8/4081 701/70 |
| 2011/0088913 | A1 | 4/2011 | Baugh |
| 2012/0111572 | A1 | 5/2012 | Cargol, Jr. |
| 2013/0112420 | A1 | 5/2013 | Bisset |
| 2014/0124211 | A1 | 5/2014 | Warnock, Jr. |
| 2014/0131049 | A1 | 5/2014 | Bourgeau |
| 2015/0094866 | A1 | 4/2015 | Pereira |
| 2015/0211504 | A1 | 7/2015 | Dieringer et al. |
| 2016/0326826 | A1 | 11/2016 | Wood |
| 2017/0138142 | A1 * | 5/2017 | Leach ..................... F04B 23/06 |
| 2017/0159393 | A1 | 6/2017 | Orban |
| 2017/0159394 | A1 | 6/2017 | Kalinec |
| 2017/0191337 | A1 | 7/2017 | Rey |
| 2018/0243527 | A1 * | 8/2018 | Zapol ...................... C01B 21/32 |
| 2019/0063175 | A1 | 2/2019 | Papadimitriou |
| 2019/0360295 | A1 | 11/2019 | Mantri |
| 2020/0011148 | A1 | 1/2020 | Babbitt |
| 2020/0056630 | A1 | 2/2020 | Nault et al. |
| 2020/0217745 | A1 | 7/2020 | Hilpert |
| 2020/0240231 | A1 | 7/2020 | Leach |
| 2020/0340500 | A1 | 10/2020 | Beard |
| 2021/0262312 | A1 | 8/2021 | Holmes |
| 2022/0018205 | A1 | 1/2022 | Holmes |
| 2022/0049568 | A1 | 2/2022 | Babbitt |
| 2022/0056778 | A1 | 2/2022 | Olson et al. |
| 2022/0136532 | A1 * | 5/2022 | Onishi .................... B64C 25/24 60/420 |
| 2022/0205337 | A1 | 6/2022 | Martin |
| 2022/0372831 | A1 | 11/2022 | Manett |
| 2022/0381111 | A1 | 12/2022 | Manett |
| 2022/0389941 | A1 | 12/2022 | Nault |

FOREIGN PATENT DOCUMENTS

| | | | |
|---|---|---|---|
| CN | 200989202 | Y | 12/2007 |
| CN | 201057015 | Y | 5/2008 |
| CN | 201250635 | Y | 6/2009 |
| CN | 201391277 | Y | 1/2010 |
| CN | 201521276 | U | 7/2010 |
| CN | 201747317 | U | 2/2011 |
| CN | 102206994 | A | 10/2011 |
| CN | 102226383 | A | 10/2011 |
| CN | 202081853 | U | 12/2011 |
| CN | 202850930 | U | 4/2013 |
| CN | 203130009 | U | 8/2013 |
| CN | 203213996 | U | 9/2013 |
| CN | 203296765 | U | 11/2013 |
| CN | 204060607 | U | 12/2014 |
| CN | 104314506 | | 1/2015 |
| CN | 204591206 | U | 8/2015 |
| CN | 105370234 | | 3/2016 |
| CN | 206562921 | U | 10/2017 |
| CN | 207111033 | U | 3/2018 |
| CN | 210483618 | U | 5/2020 |
| CN | 211230358 | U | 8/2020 |
| CN | 111810076 | A | 10/2020 |
| CN | 112459742 | A | 3/2021 |
| CN | 216077049 | U | 3/2022 |
| CN | 216665573 | U | 6/2022 |
| CN | 216811632 | U | 6/2022 |
| CN | 217327258 | U | 8/2022 |
| CN | 217999540 | U | 12/2022 |

(56) References Cited

FOREIGN PATENT DOCUMENTS

| | | | | |
|---|---|---|---|---|
| CN | 218407373 | U | | 1/2023 |
| EP | 2917460 | B1 | | 7/2017 |
| EP | 3039226 | B1 | | 2/2019 |
| EP | 3981946 | A1 | | 4/2022 |
| JP | 2001165105 | A | * | 6/2001 |
| JP | S61170304 | A | | 3/2021 |
| RU | 170179 | U1 | | 4/2017 |
| RU | 170187 | U1 | | 4/2017 |
| WO | 03070565 | A2 | | 8/2003 |
| WO | 2008074995 | A1 | | 6/2008 |
| WO | 2015009512 | A2 | | 1/2015 |
| WO | 2015028651 | A2 | | 3/2015 |
| WO | 2015153818 | A2 | | 10/2015 |
| WO | 2016100663 | A1 | | 6/2016 |
| WO | 2016131042 | A1 | | 8/2016 |
| WO | 2016182436 | A1 | | 11/2016 |
| WO | 2018231364 | A1 | | 12/2018 |
| WO | 2021045984 | A1 | | 3/2021 |

OTHER PUBLICATIONS

International Preliminary Report on Patentability of International Application No. PCT/US2021/046199 dated Mar. 2, 2023, 9 pages.

* cited by examiner

PRESSURE SENSING BLOWOUT PREVENTER CONTROL SYSTEM

CROSS-REFERENCE TO RELATED APPLICATIONS

This application is a bypass continuation application of International Patent Application No. PCT/US2022/052215, filed on Dec. 8, 2022, which claims priority to U.S. Provisional Patent Application No. 63/265,099, filed on Dec. 8, 2021, the entirety of which are incorporated by reference herein.

BACKGROUND

Drilling rigs are used to bore into the earth to create a well and then to complete and extract hydrocarbons from the well. Drilling rigs include various mechanical devices to accomplish these functions, such as drawworks, top drives, pumps, etc., which may be powered electrically. The drilling rigs also include electrical components such as control panels, sensors, processors, etc., also powered by electricity. Where available, such electrical power is provided by connection to a power grid. However, land rigs may be positioned in remote locations, where grid access may be unavailable or for other reasons difficult to obtain. Providing power lines running to offshore rigs may likewise not be an option. Accordingly, diesel generators are used in such situations to power the rig.

Safety equipment is also provided on the drilling rigs. Generally, this safety equipment is configured to operate even in the absence of an active source of electrical power, e.g., the connection to the grid is interrupted, the generators go offline, etc. Moreover, the safety equipment may call for power at a greater rate than is practical for the electrical power source to provide on demand. Accordingly, the safety equipment may be powered using stored hydraulic energy. For example, hydraulic accumulators may be provided, and hydraulic fluid may be pumped into the accumulators at high pressure when power is available. In an emergency event, the energy stored in the accumulators may be delivered rapidly to the safety equipment, even if electrical power has been lost.

A blowout preventer (BOP) provides an example of such safety equipment. A BOP positioned at the wellhead may have one or more rams that are configured to shear a tubular extending therethrough, thereby preventing fluid from escaping from the well into the ambient environment in an emergency situation. In the event of a power loss, valves are operated to direct stored hydraulic fluid from the accumulators to the shear rams, which in turn actuate and seal the BOP.

However, as wells become more complex and BOP stacks become larger, the size of the accumulators called for to deliver the large amounts of energy used to actuate the shear rams can present a challenge. In offshore contexts, rig space is at a high premium, and thus it may be desirable to avoid devoting large portions of the rig to emergency accumulators. In land-based drilling, such large accumulators can present a transportation and space issue as well. Moreover, usable volume constraints set forth from API regulations require additional and/or larger accumulators to meet system requirements. Accordingly, there is a need to replace BOP accumulator systems with more efficient, cost competitive, battery powered pumping systems to overcome usable volume constraints and ever-increasing BOP shear requirements.

SUMMARY

A control system according to one or more embodiments of the present disclosure includes a closing unit including: a tank including a usable volume of the control system, at least one primary pump configured to pump hydraulic fluid from the usable volume of the tank, a plurality of valves, and a first pressure transducer disposed between the at least one primary pump and at least one valve of the plurality of valves, wherein the at least one primary pump, the pressure transducer, and the at least one valve of the plurality of valves are hydraulically connected with the tank, wherein the first pressure transducer manages a start-stop operation of the at least one primary pump, wherein hydraulic fluid within the control system has a predetermined static pressure, and wherein the at least one pump is powered by an electric energy source.

According to one or more embodiments of the present disclosure, a pressure sensing system includes a first pressure transducer, and a second pressure transducer hydraulically connected to the first pressure transducer, wherein at least one of the first and second pressure transducers provides an electric signal to start or stop operation of at least one primary pump, and wherein the first and second pressure transducers are configured to stop at a same predetermined pressure.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
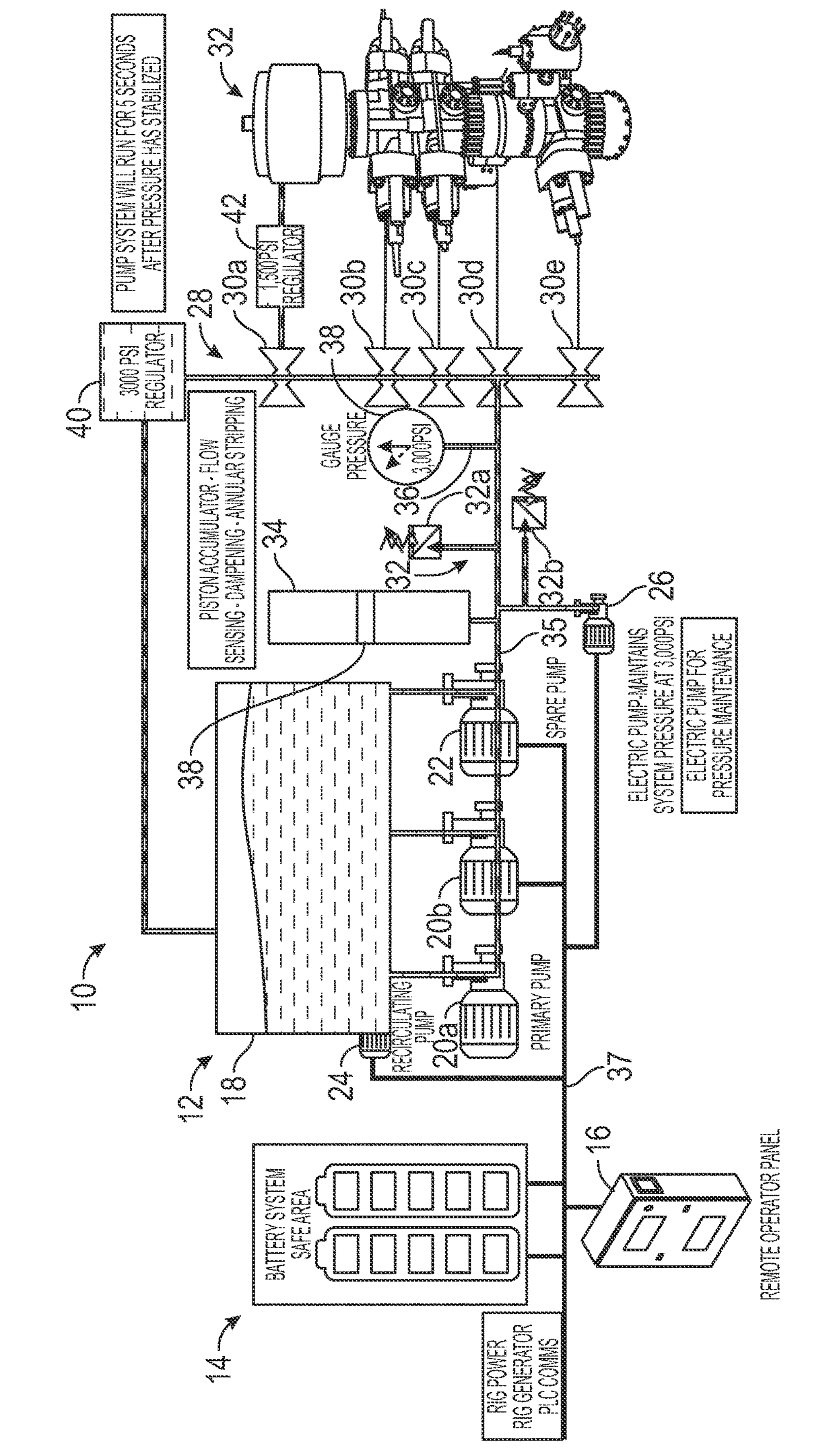
FIG. 1 shows an operational schematic of a control system, according to one or more embodiments of the present disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims, the terms "connect," "connection," "connected," "in connection with," and "connecting," are used to mean "in direct connection with," in connection with via one or more elements." The terms "couple," "coupled," "coupled with," "coupled together," and "coupling" are used to mean "directly coupled together," or "coupled together via one or more elements." The term "set" is used to mean setting "one element" or "more than one element." As used herein, the terms "up" and "down," "upper" and "lower," "upwardly" and "downwardly," "upstream" and "downstream," "uphole" and "downhole," "above" and "below," "top" and "bottom," and other like terms indicating relative positions above or below a given point or element are used in this description to more clearly describe some embodiments of the disclosure. Commonly, these terms relate to a reference point at the surface from which drilling operations are initiated as being the top point and the total depth being the lowest point, wherein the well (e.g., wellbore, borehole) is vertical, horizontal, or slanted relative to the surface. The term "fluid" encompasses liquids, gases, vapors, and combinations thereof. Numerical terms, such as "first," "second," "third," "primary," "secondary," and "tertiary," are used to distinguish components to facilitate discussion, and it should be noted that the numerical terms may be used differently or assigned to different elements in the claims.

In general, embodiments of the present disclosure may avoid or reduce the dependency on hydraulic accumulators in drilling rigs. More specifically, one or more embodiments of the present disclosure includes a control system having a hybrid electric closing unit. Even more specifically, one or more embodiments of the present disclosure manages starting, stopping, and pressure distribution of a BOP control system. The control system according to one or more embodiments of the present disclosure includes a pressure sensing system in between at least one primary pump and a valve manifold to manage the pump start-stop operation. When the pressure sensing system senses a pressure change beyond the sensor limit, the at least one primary pump will turn on until the pressure within the control system is equalized again.

The at least one primary closing pump of the control system according to one or more embodiments of the present disclosure may be used in a well control operation to provide hydraulic energy to a BOP stack. In the control system, bypass regulators, pressure regulators and relief valves will manage input pressure and return to tank pressures. One or more embodiments of the present disclosure may also include load sensing pump and valve arrangements that correspond with the return to tank system. If pressure is at or above the maximum rated working pressure of the system, a bypass regulator will bring fluid back to the tank of the control system. The control system according to one or more embodiments of the present disclosure may be designed as a closed loop.

Referring now to FIG. 1, an operational schematic of a control system 10 according to one or more embodiments of the present disclosure is shown. As shown in FIG. 1, the control system 10 according to one or more embodiments of the present disclosure may include a hybrid electric closing unit 12, a battery system 14, and a remote operator panel 16, for example. As further shown in FIG. 1, the hybrid electric closing unit 12 includes at least a tank 18, at least one primary pump 20*a*, 20*b*, a pneumatic pump 26, a valve manifold 28, a pressure sensing system 32, and a pressure storage reservoir 34, according to one or more embodiments of the present disclosure, the specific details of which are further described below. As shown in FIG. 1, the at least one primary pump 20*a*, 20*b*, the pressure storage reservoir 34, the pressure sensing system 32, and the valve manifold 28 are hydraulically connected with the tank 18 via hydraulic circuit 35, for example. As further shown in FIG. 1, the at least one primary pump 20*a*, 20*b* and the pneumatic pump 26 may be powered by an electric energy source as further described below (as shown by electric control line 37, which may be wired or wireless, for example). In other embodiments of the present disclosure, the pneumatic pump 26 may be powered by compressed air, for example.

Still referring to FIG. 1, the tank 18 of the hybrid electric closing unit 12 according to one or more embodiments of the present disclosure includes a usable volume of the control system 10. That is, the tank 18 includes a usable volume of hydraulic fluid in accordance with applicable regulations, for example. As further shown in FIG. 1, the hybrid electric closing unit 12 may include at least one primary pump 20*a*, 20*b* that is configured to pump hydraulic fluid from the usable volume of the tank 18. According to one or more embodiments of the present disclosure, the hybrid electric closing unit 12 may also include at least one spare pump 22 in addition to the at least one primary pump 20*a*, 20*b*. As shown in FIG. 1, the spare pump 22 is hydraulically connected to the at least one primary pump 20*a*, 20*b*, the pressure storage reservoir 34, the valve manifold 28, and the pressure sensing device 32 along the hydraulic circuit 35, and the spare pump 22 is powered by an electric energy source. As further shown in FIG. 1, the spare pump 22 is also configured to pump hydraulic fluid from the usable volume of the tank 18. In this way, the spare pump 22 provides redundancy to the at least one primary pump 20*a*, 20*b*, according to one or more embodiments of the present disclosure. In one or more embodiments of the present disclosure, the hybrid electric closing unit 12 may also include a recirculating pump 24 attached to the tank 18 for returning unused usable volume of hydraulic fluid back to the tank 18, as shown in FIG. 1, for example. As further shown in FIG. 1, the recirculating pump 24 is powered by an electric energy source. According to one or more embodiments of the present disclosure, any of the at least one primary pump 20*a*, 20*b*, the spare pump 22, and the recirculating pump 24 may have an automatic and manual setting whereby a user can turn on any of the pumps manually in case the control system 10 has lost local control either from a programmable logic controller (PLC) or embedded controller.

Still referring to FIG. 1, the hybrid electric closing unit 12 according to one or more embodiments of the present disclosure may also include a valve manifold 28 comprising a plurality of valves 30*a*, 30*b*, 30*c*, 30*d*, 30*e*, for example. According to one or more embodiments of the present disclosure, the plurality of valves 30*a*, 30*b*, 30*c*, 30*d*, 30*e* of the valve manifold 28 are configured to operatively connect to a hydraulic device 32, such as a BOP stack or other pressure control equipment, for example. More specifically, each valve of the plurality of valves of the valve manifold 28 may be configured to connect to a particular preventer or function on the BOP stack. For example, valve 30*a* of the plurality of valves may be configured to connect to an annular preventer of the BOP stack, while valves 30*b*, 30*c*, 30*d*, and 30*e* of the plurality of valves may be configured to connect to different ram preventers of the BOP stack including one or more shear rams, pipe rams, or blind rams, for example, for controlling a function of the BOP stack. As shown in FIG. 1, a pressure regulator 42 may be disposed between the valve manifold 28 and the hydraulic device 32 or BOP stack. In this way, the plurality of valves may be function valves having regulated outputs to predefined functions of the hydraulic device 32 or BOP stack, according to one or more embodiments of the present disclosure. While FIG. 1 shows that the valve manifold 28 includes five valves, the number of valves on the valve manifold 28 is non-limiting, and more or less valves may be included in the valve manifold 28 without departing from the scope of the disclosure. Further, while FIG. 1 shows the plurality of valves of the valve manifold 28 connected to a BOP stack, the plurality of valves of the valve manifold 28 may be connected to other types of hydraulic devices for control using the control system 10 without departing from the scope of the present disclosure.

Still referring to FIG. 1, the hybrid electric closing unit 12 according to one or more embodiments of the present disclosure may also include a pneumatic pump 26. As shown in FIG. 1, the pneumatic pump 26 is hydraulically connected to the at least one primary pump 20*a*, 20*b*, the pressure storage reservoir 34, the valve manifold 28, and the pressure sensing system 32 along the hydraulic circuit 35, and the pneumatic pump 26 is powered by an electric energy source. According to one or more embodiments of the present disclosure, the hydraulic fluid within the control system 10 has a predetermined static pressure. The pneumatic pump 26 of the hybrid electric closing unit 12 functions to maintain the control system 10 at this predetermined static pressure. In one or more embodiments of the present disclosure, the pneumatic pump 26 maintains the control system 10 at the predetermined static pressure by providing pressure to the valve manifold 28 and the pressure sensing system 32 to ensure that the pressure held at the valve and the pressure sensing system 32 is not activated. According to one or more embodiments of the present disclosure, the predetermined static pressure of the control system 10 may be 3,000 psi, for example. However, the static pressure of the control system 10 may be at a different pressure level without departing from the scope of the present disclosure. As shown in FIG. 1, the control system 10 according to one or more embodiments of the present disclosure may also include a pressure gauge 38 connected to the hydraulic circuit 35 for monitoring pressure in the control system 10. According to one or more embodiments of the present disclosure, the pneumatic pump 26 may have an automatic and manual setting whereby a user can turn on the pneumatic pump 26 manually in case the control system 10 has lost local control either from the PLC or embedded controller.

Still referring to FIG. 1, the hybrid electric closing unit 12 according to one or more embodiments of the present disclosure may also include a pressure sensing system 32 disposed between the at least one primary pump 20*a*, 20*b*, and the valve manifold 28. According to one or more embodiments of the present disclosure, and as further described below, the pressure sensing system 32 manages a start-stop operation of the at least one primary pump 20*a*, 20*b*. The pressure sensing system 32 according to one or more embodiments of the present disclosure may include a first pressure sensor 32*a* and a second pressure sensor 32*b* hydraulically connected to the first pressure sensor 32*a* via the hydraulic circuit 35, as shown in FIG. 1 for example. According to one or more embodiments of the present disclosure, pressure sensors 32*a*, 32*b* may include a pressure switch or a pressure transducer, for example. According to one or more embodiments of the present disclosure, the first pressure sensor 32*a* is configured to provide a first electric signal to start the at least one primary pump 20*a*, 20*b* when the hydraulic fluid within the control system 10 drops to at least a first pressure below the predetermined static pressure. Such a pressure drop in the control system 10 may be monitored by the pressure gauge 38 connected to the hydraulic circuit 35, as previously described, for example. As shown in FIG. 1 for example, the first pressure sensor 32*a* is configured to provide the first electric signal to start the at least one primary pump 20*a*, 20*b* when the hydraulic fluid within the control system 10 drops to at least 2,500 psi, or at least 500 psi below the predetermined static pressure of the control system 10. However, the first pressure of the first pressure sensor 32*a* is not limiting, and the first pressure sensor 32*a* may be configured to provide the first electric signal to start the at least one primary pump 20*a*, 20*b* at a different pressure below the predetermined static pressure of the control system 10 without departing from the scope of the present disclosure. For example, the first pressure that triggers the first pressure sensor 32*a* may be any pressure that is greater than a pressure drop caused by fluid loss due to a leak in the control system 10. As also shown in FIG. 1, the first pressure sensor 32*a* is configured to stop or turn off when the hydraulic fluid within the control system 10 returns to the predetermined static pressure, according to one or more embodiments of the present disclosure.

As previously described, the pressure sensing system 32 according to one or more embodiments of the present disclosure may also include a second pressure sensor 32*b* hydraulically connected to the first pressure sensor 32*a* via the hydraulic circuit 35, as shown in FIG. 1, for example. According to one or more embodiments of the present disclosure, the second pressure sensor 32*b* is configured to provide a second electric signal to start the pneumatic pump 26 when hydraulic fluid within the control system 10 drops to at least a second pressure below the predetermined static pressure. Such a pressure drop in the control system 10 may be monitored by the pressure gauge 38 connected to the hydraulic circuit 35, as previously described, for example. As shown in FIG. 1 for example, the second pressure sensor 32*b* is configured to provide the second electric signal to start the pneumatic pump 26 when the hydraulic fluid within the control system 10 drops to at least 2,800 psi, or at least 200 psi below the predetermined static pressure of the control system 10. In this way, the second pressure sensor 32*b* and the pneumatic pump 26 are able to maintain pressure in the control system 10 if one or more valves of the control system 10 begins to leak, for example. However, the second pressure of the second pressure sensor 32*b* is not limiting, and the second pressure sensor 32*b* may be configured to provide the second electric signal to start the pneumatic pump 26 at a different pressure below the predetermined static pressure of the control system 10, as long as the first pressure (as previously described) is lower than the second pressure, without departing from the scope of the present disclosure. As also shown in FIG. 1, the second pressure sensor 32*b* is configured to stop or turn off when the hydraulic fluid within the control system 10 returns to the predetermined static pressure, according to one or more embodiments of the present disclosure. That is, according to one or more embodiments of the present disclosure, the first pressure sensor 32*a* and the second pressure sensor 32*b* of the pressure sensing system 32 are configured to stop at a same predetermined static pressure of the control system 10.

Still referring to FIG. 1, the hybrid electric closing unit 12 according to one or more embodiments of the present disclosure also includes a pressure storage reservoir 34. According to one or more embodiments of the present disclosure, the pressure storage reservoir 34 may be a piston accumulator or a bladder accumulator, for example. According to one or more embodiments of the present disclosure, the pressure storage reservoir 34 may include a movable member 38 that separates a charged-gas section filled with an inert gas (e.g., nitrogen) and a hydraulic-fluid section filled with hydraulic fluid. The charged gas is pressurized and, thus, acts as a spring against the movable member 38 to maintain the hydraulic fluid in the fluid section under pressure. The fluid section is connected to the hydraulic circuit 35 so that the hydraulic fluid may be used to operate the hydraulic device 32, such as a component of a BOP stack or other well equipment. As hydraulic fluid is discharged from the fluid section, the movable member 38 moves within the pressure storage reservoir 34 under pressure from the gas to maintain pressure on the remaining hydraulic fluid until full discharge. Thus, as hydraulic fluid is discharged from the fluid section, the movable member 38 moves, making the gas section larger and the fluid section smaller. Alternatively, the pressure storage reservoir 34 may include an elastomer bladder filled with an inert gas disposed in a pressure vessel containing hydraulic fluid. When the pressure drops in the control system 10, the compressed gas in the bladder of the pressure storage reservoir 34 expands and pushes the stored hydraulic fluid into the hydraulic circuit 35 so that the hydraulic fluid may be used to operate the hydraulic device 32, as previously described, for example.

Still referring to FIG. 1, the hybrid electric closing unit 12 according to one or more embodiments of the present disclosure may also include means for regulating hydraulic pressure 40 hydraulically connected to the valve manifold 28, for example. According to one or more embodiments of the present disclosure, the means for regulating hydraulic pressure 40 returns hydraulic fluid to the tank 18 if a pressure of the control system 10 exceeds the predetermined static pressure of the control system 10, for example. According to one or more embodiments of the present disclosure, the means for regulating hydraulic pressure 40 may include a bypass regulator, a backpressure regulator, a relief valve, a variable displacement pump, a variable speed motor, or other equivalent structures that either actively or passively control the hydraulic fluid flowing through the valve manifold 28, for example.

As previously described, at least the at least one primary pump 20*a*, 20*b*, the spare pump 22, the recirculating pump 24, and the pneumatic pump 26 may be powered by an electric energy source. Moreover, the remote operator panel 16 of the control system 10 according to one or more embodiments of the present disclosure may also be powered by the electric energy source. According to one or more embodiments of the present disclosure, the electric energy source of the control system 10 may include at least one of rig power, a rig generator, an uninterruptable power supply (UPS), and at least one battery system, alone or in any combination, without departing from the scope of the present disclosure. According to one or more embodiments of the present disclosure, the electric energy source of the control system 10 may include rig power as a primary energy source, at least one rig generator as a secondary energy source, and at least one battery system 14 as the tertiary energy source, for example. Alternatively, the at least one battery system 14 may be the primary energy source of the control system 10, and the rig power may be the secondary energy source of the control system 10, according to one or more embodiments of the present disclosure. Designations of primary, secondary, and tertiary energy sources are not limiting, however, and may change according to the needs of the control system 10 according to one or more embodiments of the present disclosure. According to one or more embodiments of the present disclosure, the at least one battery system 14 is trickle charged by a rig providing the rig power, for example. Further particulars of the at least one battery system 14 according to one or more embodiments of the present disclosure are described in reference to later figures below.

Still referring to FIG. 1, a method includes operatively connecting the control system 10 of one or more embodiments of the present disclosure to a hydraulic device 32, such as a BOP stack or other well equipment, as previously described. At homeostasis, the control system 10 according to one or more embodiments of the present disclosure is maintained at a predetermined static pressure, as previously described. After connecting the control system 10 according to one or more embodiments of the present disclosure to the hydraulic device 32, at least one valve of the plurality of valves 30*a*, 30*b*, 30*c*, 30*d*, 30*e* of the valve manifold 28 may be opened due to a function of the hydraulic device 32, such as a BOP stack or other well equipment, for example. According to one or more embodiments of the present disclosure, the valve that is opened is the valve corresponding to a particular preventer or function on the BOP stack (e.g., the annular preventer or a type of ram preventer, for example), or the valve corresponding to a particular component of the hydraulic device 32 or other well equipment for example. Thereafter, hydraulic energy may be discharged from the pressure storage reservoir 34, thereby flooding the hydraulic circuit 35 of the control system 10. This discharged hydraulic energy may be applied through the open valve to a component of the BOP stack, hydraulic device, or other well equipment to control a particular function of the BOP stack, hydraulic device, or other well equipment. As shown in FIG. 1, according to one or more embodiments of the present disclosure, the hydraulic energy may pass through a pressure regulator 42 before reaching the component of the BOP stack, hydraulic device, or other well equipment so as to prevent damage to the component or otherwise to control the pressure that is ultimately applied to the component, for example. In this way, the at least one primary pump 20*a*, 20*b* of the control system 10 may operate at full force, as the pressure regulator 42 manages the system pressures that are ultimately applied to the component, for example. When the pressure of the control system 10 drops to at least the first pressure below the predetermined static pressure, such as to 2,500 psi, for example, the first pressure sensor 32*a* starts or turns on, which starts or turns on the at least one primary pump 20*a*, 20*b*. If the at least one primary pump 20*a*, 20*b* fails to turn on, the spare pump 22 may be turned on instead. The pumping action from the at least one primary pump 20*a*, 20*b*, and/or the spare pump 22 pumps hydraulic fluid from the tank 18 into the hydraulic circuit 35, thereby increasing the pressure of the control system 10. As hydraulic fluid from the tank 18 is pumped into the hydraulic circuit 35, the pressure storage reservoir 34 is able to recharge with hydraulic fluid. When the pressure in the control system 10 is restored to the predetermined static pressure, which may be 3000 psi, for example, the first pressure sensor 32*a* stops or turns off. According to one or more embodiments of the present disclosure, the method further includes venting hydraulic fluid into the tank 18 via the bypass regulator 40 when the hydraulic fluid within the control system 10 exceeds the predetermined static pressure. According to one or more embodiments of the present disclosure, pumping action from the at least one primary pump 20*a*, 20*b*, and/or the spare pump 22 may continue for a predetermined time after the control system 10 is restored to the predetermined static pressure. For example, pumping action from the at least one primary pump 20*a*, 20*b*, and/or the spare pump 22 may continue for five seconds after the control system 10 is restored to the predetermined static pressure. However, this predetermined time of five seconds is non-limiting, and other times are contemplated and are within the scope of the present disclosure.

According to one or more embodiments of the present disclosure, the operational method may also include starting the pneumatic pump 26 by starting the second pressure sensor 32*b* when the hydraulic fluid within the control system 10 drops to at least the second pressure below the predetermined static pressure, which may be 2,800 psi, for example. Such pumping action from the pneumatic pump 26 advantageously maintains pressure of the control system 10 at the predetermined static pressure even if one or more of the valves of the plurality of valves of the valve manifold 28 leaks, for example. According to one or more embodiments of the present disclosure, the second pressure sensor 32*b* may stop the pneumatic pump 26 when hydraulic fluid in the control system 10 returns to the predetermined static pressure.

Still referring to FIG. 1, the control system 10 may include a remote operator panel 16, as previously described. While only one remote operator panel 16 is shown in FIG. 1, the control system 10 may include additional remote operator panels 16 without departing from the scope of the present disclosure. According to one or more embodiments of the present disclosure, the remote operating panel 16 may be located away from the hydraulic device 32 connected to the control system 10, which may be a BOP stack, as previously described. According to one or more embodiments of the present disclosure, the remote operator panel 16 may be located in a drilling cabin, in a tool pusher's cabin, or on the drilling floor, for example. Advantageously, the remote operator panel 16 may facilitate remote operation of the control system 10, according to one or more embodiments of the present disclosure.

According to one or more embodiments of the present disclosure, starting and stopping of one or more pumps of the control system 10 may be controlled by valve function either via the remote operator panel 16 or on the HMI. A proximity sensor on a valve of the valve manifold 28 or an HMI function may trigger the pumps to start and stop, according to one or more embodiments of the present disclosure. Moreover, pressure and flow through the control system 10 may be controlled by the predefined function. For example, if an annular function is fired, the control system 10 will auto-regulate the pump output to 1,500 psi, as shown in FIG. 1 for example, and stop the flow when the pressure reaches the predetermined static level. There may be a gallon count for each function, according to one or more embodiments of the present disclosure, for example.

According to one or more embodiments of the present disclosure, certain automatic safety operations may be integrated into the control system 10. For example, if the control system 10 loses power, a Deadman auto shear safety operation may automatically function, causing communications and hydraulic supply of the control system 10 to fire a predetermined set of functions to close in the well. As another example, in the case of a well control event, an operator can signal a function from either a push button or the HMI that will trigger a predetermined sequence of events for an emergency sequencing automatic function. As another example, in the case of a detected kick, the control system 10 according to one or more embodiments of the present disclosure may turn on the pumping system and sequence the automated system to function the BOP stack.

Figure 2:
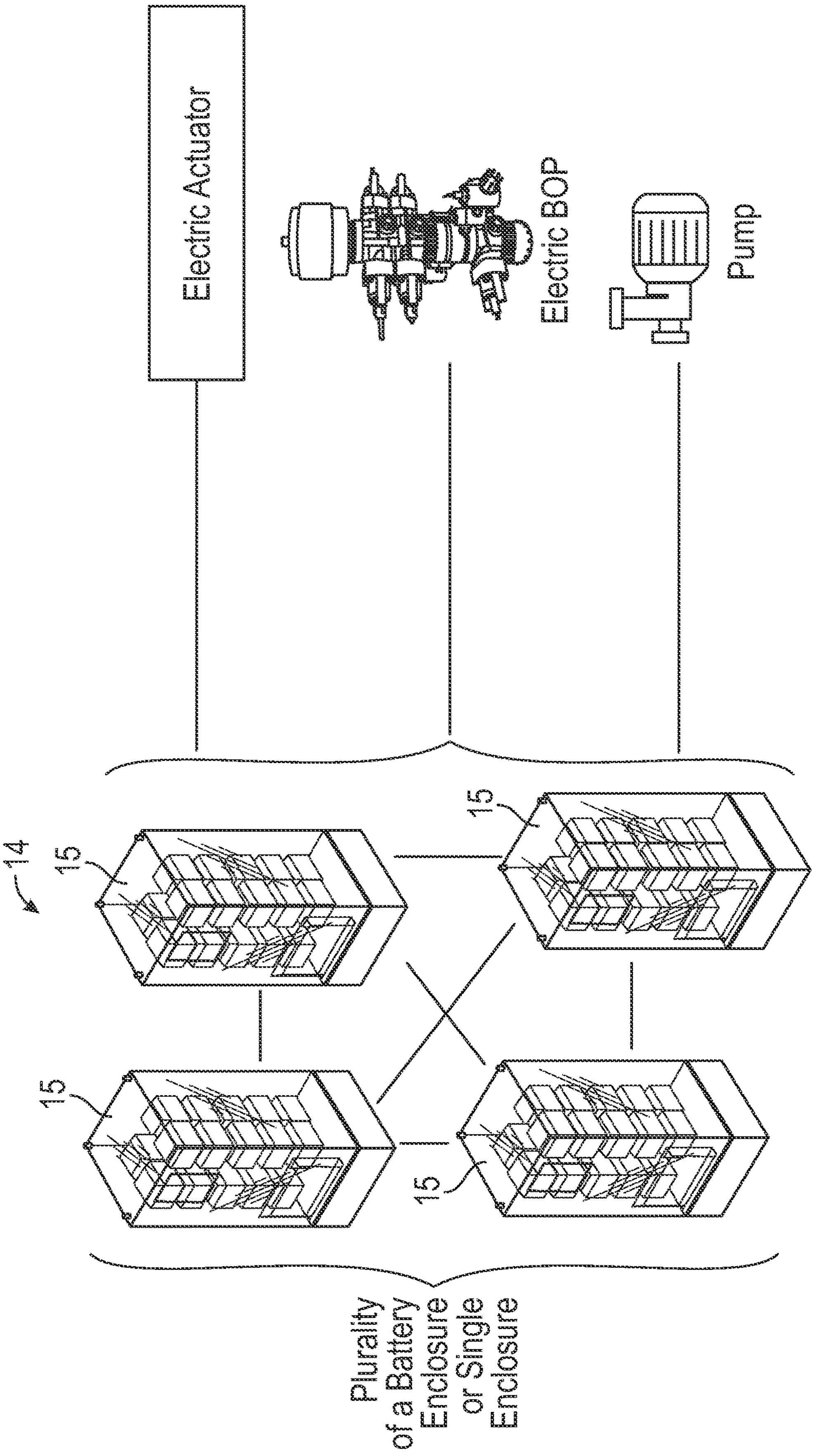
FIG. 2 shows a battery system connected to various components, according to one or more embodiments of the present disclosure.

As previously described with respect to FIG. 1, the control system 10 may include a battery system 14 for supplying electric energy to at least the pumps 20*a*, 20*b*, 22, and 24 of the control system 10. Referring now to FIG. 2, the battery system 14 according to one or more embodiments of the present disclosure may be connected to various components. For example, the battery system 14 may be connected to a pump, as previously described, an electric actuator, or even an electric BOP, for example, for supplying electric energy to these components. As further shown in FIG. 2, the battery system 14 according to one or more embodiments of the present disclosure may include a single battery enclosure 15 or a plurality of battery enclosures 15, for example. In one or more embodiments of the present disclosure, a single battery enclosure 15 may operate as a standalone battery system 14, or a plurality of battery enclosures 15 may be connected to each other, as shown in FIG. 2, for example, in an interconnected battery system 14.

Figure 3:
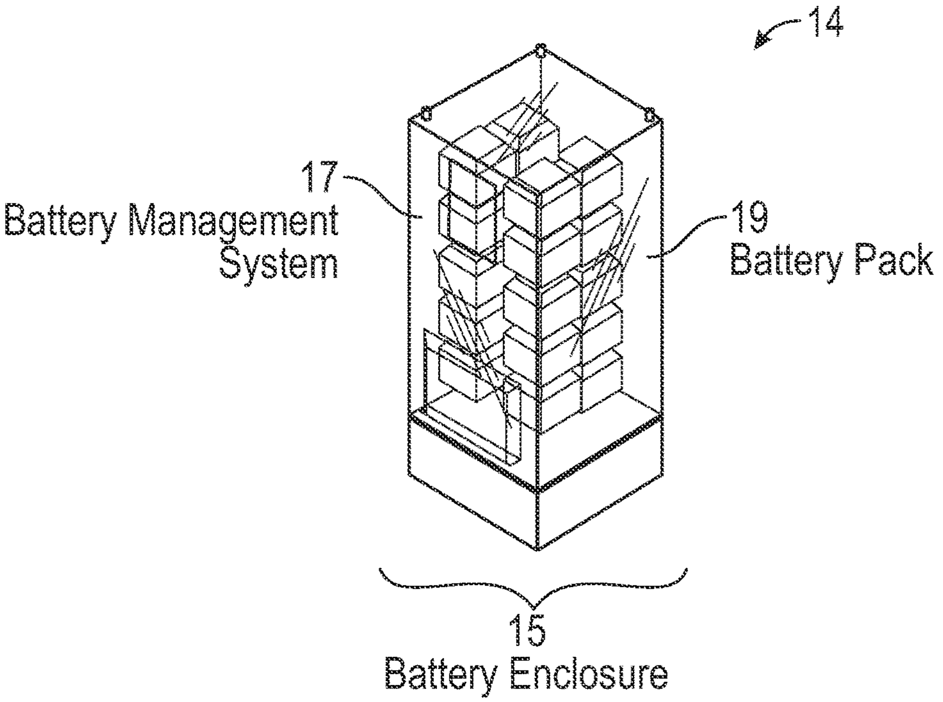
FIG. 3 shows components of a battery system according to one or more embodiments of the present disclosure.

Referring now to FIG. 3, the battery enclosure 15 of the battery system 14 according to one or more embodiments of the present disclosure may include a battery management system 17 and a plurality of battery packs 19, for example. According to one or more embodiments of the present disclosure, the battery management system 17 may include an HMI and an associated processor for receiving and displaying data regarding battery charge, battery health, whether a battery is online for communication, and potential alarm conditions, for example. Examples of such HMI displays are provided in FIGS. 6A and 6B, for example. According to one or mor embodiments of the present disclosure, HMI displays or LED lights of the battery management system 17 will trend and monitor the overall charge of the battery system 14. According to one or more embodiments of the present disclosure, the battery management system 17 is capable of monitoring the battery system 14 down to the battery cell level. The battery management system 17 is configured to manage equipment inclination, vibration, shock, static, intermittent temperatures, and long term battery health in accordance with one or more embodiments of the present disclosure.

Figure 4:
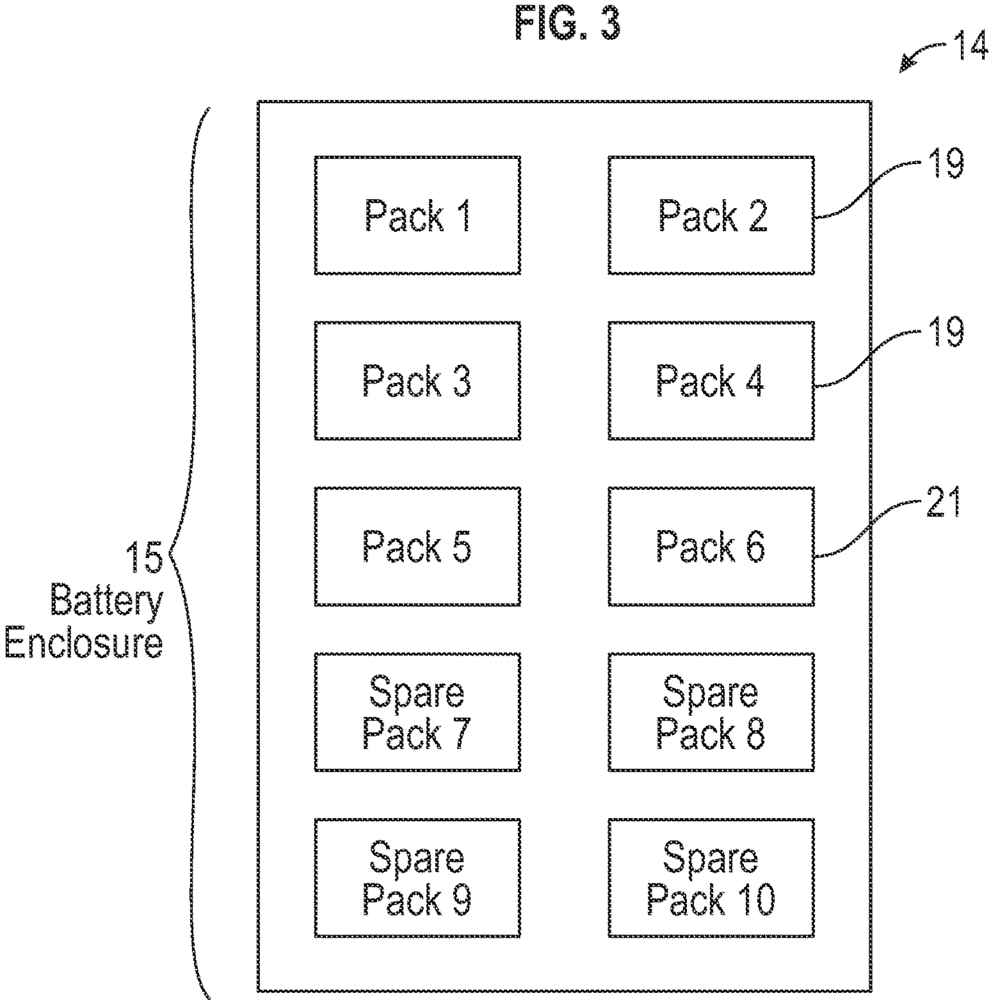
FIG. 4 shows a battery system having a battery enclosure according to one or more embodiments of the present disclosure.
Figure 5:
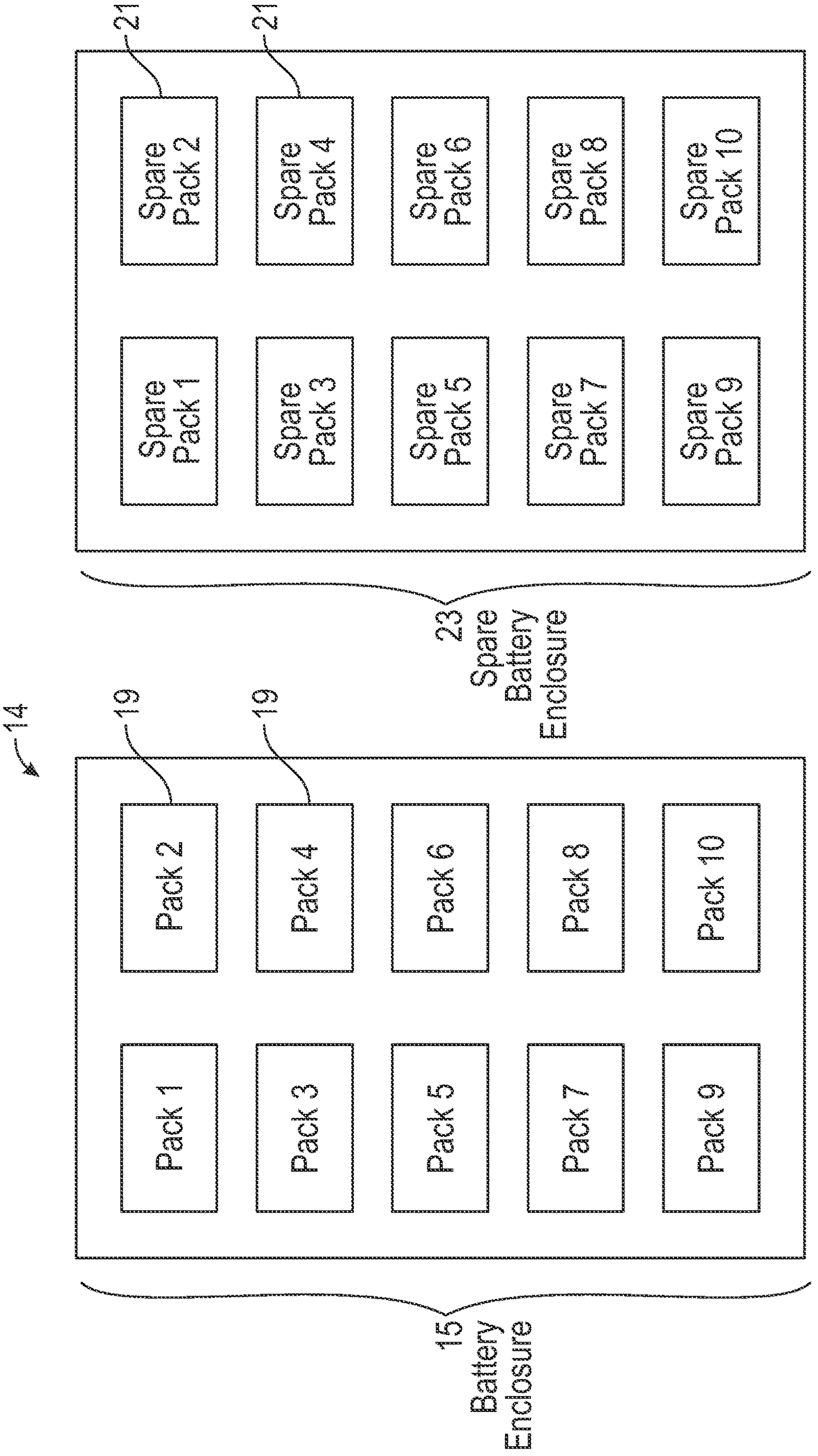
FIG. 5 shows a battery system, including a battery enclosure and a spare battery enclosure according to one or more embodiments of the present disclosure.
Figure 6A:
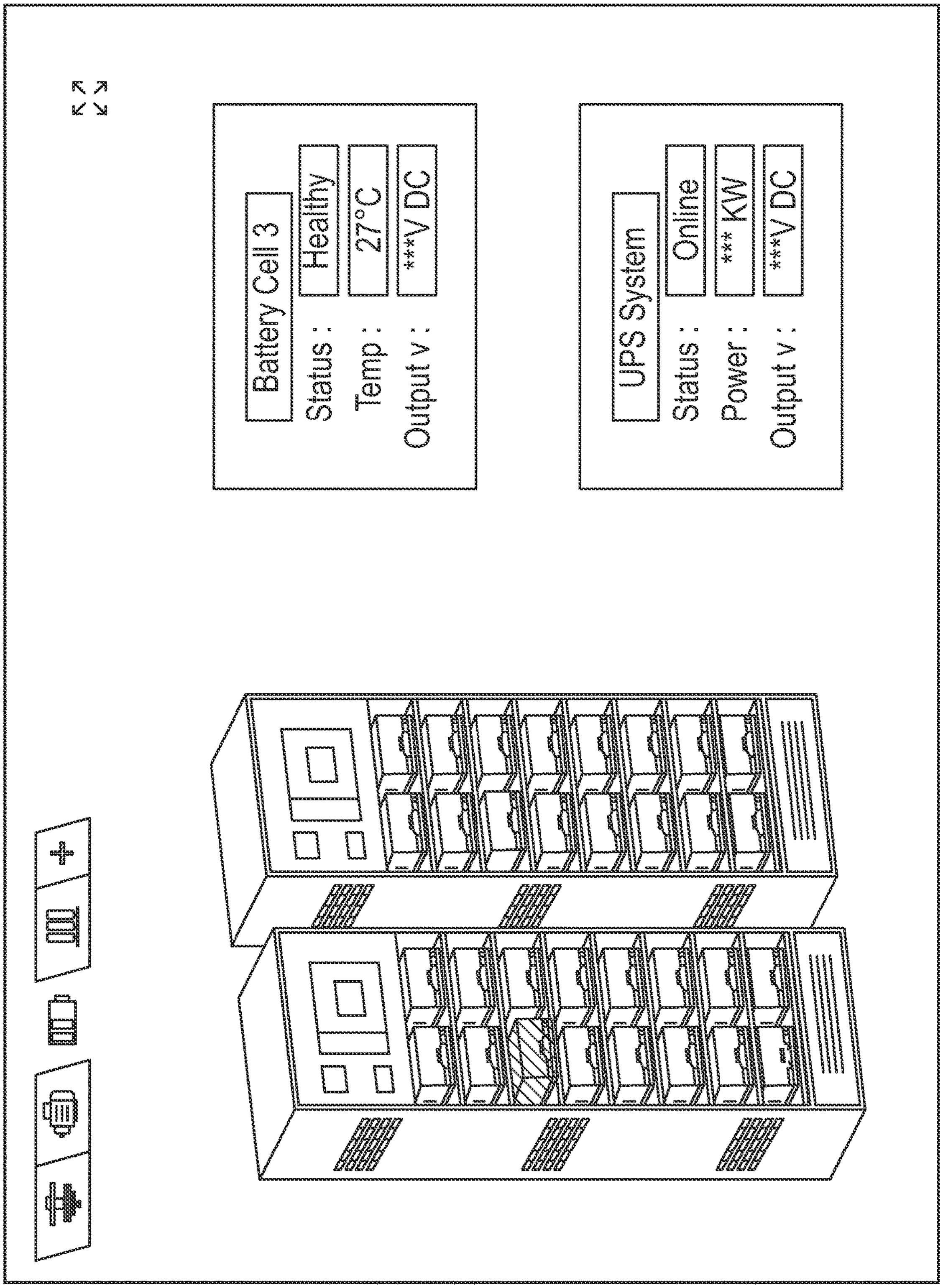
FIG. 6A shows an example of a display of a human machine interface (HMI) of a status of a battery system, according to one or more embodiments of the present disclosure.
Figure 6B:
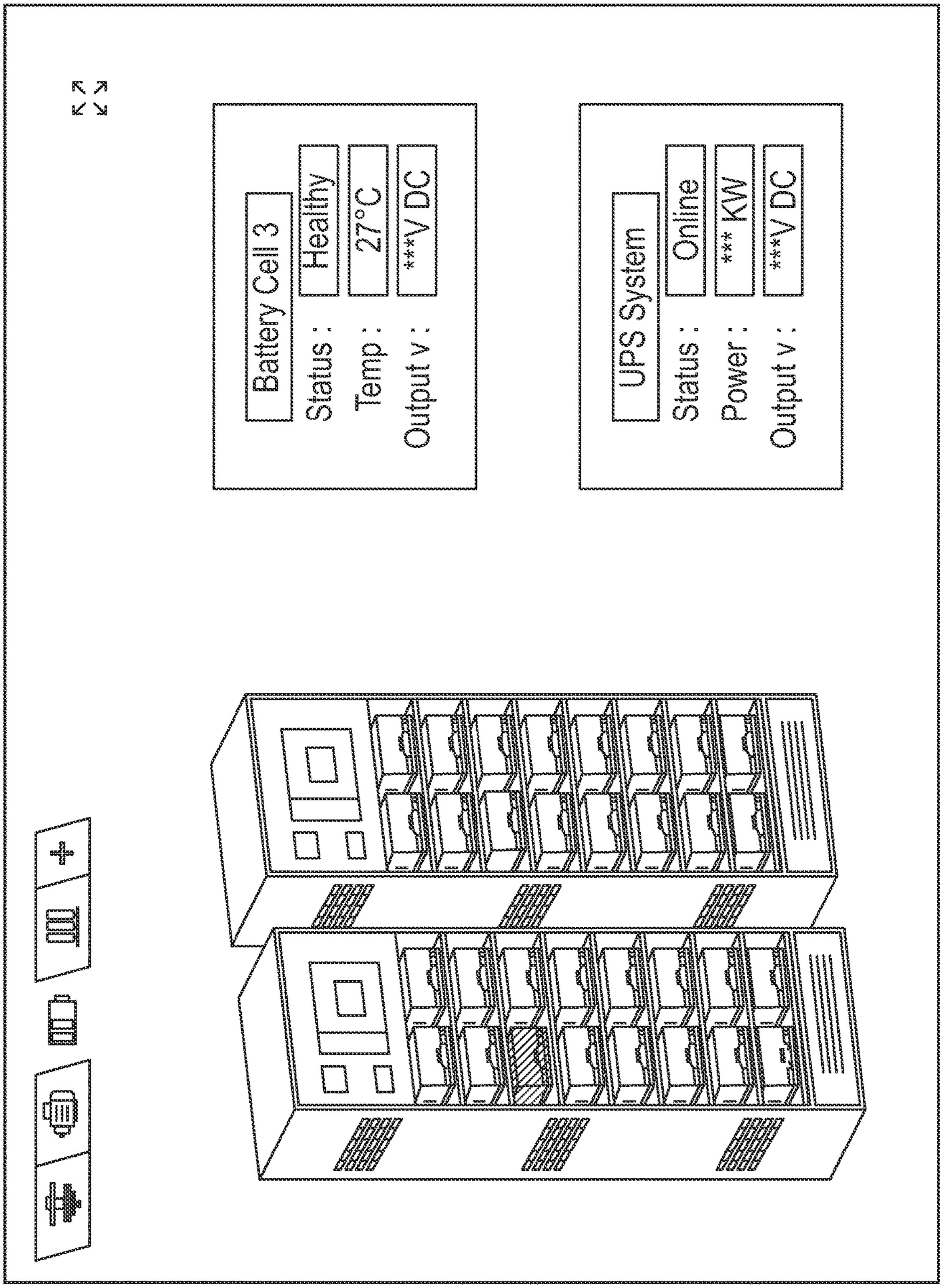
FIG. 6B shows an example of a display of an HMI of a status of a battery system, according to one or more embodiments of the present disclosure.

FIGS. 4 and 5 provide examples of battery redundancy systems for electric and hybrid pressure control equipment, which may be used on land, surface offshore (jack-up), or offshore, according to one or more embodiments of the present disclosure. Hybrid surface BOP control systems, electric BOPs, chokes, intervention or top side electrical equipment all require various forms of redundant power to support the control network. This backup power supply or uninterruptable power supply (UPS) powers the HMI/PLCs to enable an electric signal to be transferred to a predetermined stored energy backup signal in the event primary power is lost. The control system 10 according to one or more embodiments of the present disclosure utilizes primary stored energy in battery systems to power the triggering signal, and also provides redundancy and availability to facilitate the function of primary operations. For example, if a rig loses power, the UPS kicks on, powering the operator panels, PLCs, HMIs, and modems, i.e., the primary communications and power network of the control system 10. As previously described, HMI displays such as those provided in FIGS. 6A and 6B may be used the visualize the status of the battery system 14 down to the battery cell level, along with additional parameters. As also shown in FIGS. 6A and 6B, HMI displays may be also used to visualize the status and additional parameters of a UPS system, which may serve as a redundant power supply for the control system 10, according to one or more embodiments of the present disclosure. One or more embodiments of the present disclosure facilitates battery and power management for the power and communications network, and also provides sufficient power to support the function. In this way, a battery system may be used to replace one or more accumulators in a control system 10 according to one or more embodiments of the present disclosure, for example. Intrinsically, the battery system according to one or more embodiments of the present disclosure separates redundancy within the same battery enclosure with multiple isolated battery cells or multiple battery units between multiple battery enclosures.

Referring now to FIG. 4, the plurality of battery packs 19 of a battery enclosure 15 of a battery system 14 is shown in more detail in accordance with one or more embodiments of the present disclosure. As shown in FIG. 4, the battery enclosure 15 includes a plurality of removable battery packs 19 arranged therein. While FIG. 4 shows six removable battery packs 19 arranged within the battery enclosure 15, this number is non-limiting, and a different amount of removable battery packs 19 may be arranged within the battery enclosure 15 without departing from the scope of the present disclosure. According to one or more embodiments of the present disclosure, the battery enclosure 15 may have at least one removable hot spare battery pack 21 arranged in the battery enclosure 15 along with the plurality of removable battery packs 19. While FIG. 4 shows four removable hot spare battery packs 21 arranged within the battery enclosure 15, this number is non-limiting, and a different amount of removable hot spare battery packs 21 may be arranged within the battery enclosure 15 without departing from the scope of the present disclosure. According to one or more embodiments of the present disclosure, any battery pack of the plurality of removable battery packs 19 may be replaced with the at least one removable hot spare battery pack 21 within the battery enclosure 15.

Referring now to FIG. 5, a battery system 14 is shown having a primary battery enclosure 15 and a spare battery enclosure 23, according to one or more embodiments of the present disclosure. As shown in FIG. 5, the primary battery enclosure 15 may include only a plurality of removable battery packs 19 arranged therein, and the spare battery enclosure 23 may include only a plurality of removable hot spare battery packs 21 arranged therein. The number of removable battery packs 19 or hot spare battery packs 21 in a given battery enclosure is non-limiting, as previously described. In such a battery system 14 according to one or more embodiments of the present disclosure, any battery pack of the plurality of removable battery packs 19 in the primary battery enclosure 15 may be replaced with at least one of the removable hot spare battery packs 21 of the spare battery enclosure 23. In this way, the spare battery enclosure 23 provides an onsite available inventory of charged batteries for the battery system 14.

Advantageously, the modularity of the battery systems 14 shown in FIGS. 4 and 5 ensures that if a battery pack 19 fails, a redundant battery pack 21 may be hot swapped in as the primary battery supply. The same can be said if the primary battery enclosure 15 fails. Should the battery management system 17 find a battery fault, the battery enclosure 15 may be opened, power may be turned off to the battery enclosure 15, and the faulty battery pack 19, may be replaced with a hot spare battery pack 21 similar to a server rack. The ambition of the battery systems 14 according to one or more embodiments of the present disclosure is to maximize redundancy between single or multiple battery enclosures 15, but also for the battery enclosures 15 to be redundant and hot swappable within themselves. Such redundancy maximizes the availability of the battery systems 14 according to one or more embodiments of the present disclosure to meet or exceed industry standards.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A control system comprising:

a closing unit comprising:

a tank comprising a usable volume of the control system;

at least one primary pump configured to pump hydraulic fluid from the usable volume of the tank;

a plurality of valves;

a first pressure transducer disposed between the at least one primary pump and at least one valve of the plurality of valves, wherein the at least one primary pump, the first pressure transducer, and the at least one valve of the plurality of valves are hydraulically connected with the tank, wherein the first pressure transducer manages a start-stop operation of the at least one primary pump, wherein hydraulic fluid within the control system has a predetermined static pressure, and wherein the at least one primary pump is powered by an electric energy source, the closing unit further comprising:

a pneumatic pump, wherein the pneumatic pump is hydraulically connected to the at least one primary pump, the first pressure transducer, and the at least one valve of the plurality of valves, and wherein the pneumatic pump maintains the control system at the predetermined static pressure.

2. The control system of claim 1, wherein the at least one valve of the plurality of valves is configured to operatively connect to a hydraulic device.

3. The control system of claim 2, wherein the hydraulic device is a pressure control equipment.

4. The control system of claim 1, wherein the electric energy source comprises:

at least one selected from the group consisting of: rig power; a rig generator; an uninterruptable power supply (UPS); and at least one battery system.

5. The control system of claim 4, wherein the at least one battery system is trickle charged by a rig providing the rig power.

6. The control system of claim 1, further comprising a remote operator panel powered by the electric energy source.

7. The control system of claim 1, further comprising at least one spare pump powered by the electric energy source, wherein the at least one spare pump is hydraulically connected to the at least one primary pump, the at least one valve of the plurality of valves, and the pressure transducer, and wherein the at least one spare pump provides redundancy to the at least one primary pump.

8. The control system of claim 1, further comprising means for regulating hydraulic pressure hydraulically connected to the at least one valve of the plurality of valves, wherein the means for regulating hydraulic pressure returns hydraulic fluid to the tank if a pressure of the control system exceeds the predetermined static pressure.

9. The control system of claim 1, wherein the electric energy source comprises a battery system comprising:

a primary battery enclosure comprising a plurality of removable battery packs arranged therein; and at least one removable hot spare battery pack, wherein any battery pack of the plurality of removable battery packs may be replaced with the at least one removable hot spare battery pack.

10. The control system of claim 9, wherein the at least one removable hot spare battery pack is arranged in the primary battery enclosure along with the plurality of removable battery packs.

11. The control system of claim 9, wherein the at least one removable hot spare battery pack is arranged in a spare battery enclosure.

12. The control system of claim 1, wherein the first pressure transducer is configured to provide a first electric signal to start the at least one primary pump when the hydraulic fluid within the control system drops to at least a first pressure below the predetermined static pressure, and wherein the first pressure transducer is configured to stop when the hydraulic fluid within the control system returns to the predetermined static pressure.

13. The control system of claim 1, wherein the first pressure transducer is configured to provide a first electric signal to start the at least one primary pump when the hydraulic fluid within the control system drops to at least a first pressure below the predetermined static pressure, the control system further comprising: a second pressure transducer disposed between the pneumatic pump and another valve of the plurality of valves, wherein the second pressure transducer is configured to provide a second electric signal to start the pneumatic pump when the hydraulic fluid within the control system drops to at least a second pressure below the predetermined static pressure, wherein the first pressure is lower than the second pressure, and wherein the first and second pressure transducers are configured to stop when the hydraulic fluid within the control system returns to the predetermined static pressure.

14. A method comprising:

operatively connecting the control system of claim 13 to a hydraulic device;

opening at least one valve of the plurality of valves;

applying hydraulic energy to a component of the hydraulic device through the at least one open valve to control a function of the hydraulic device;

starting the at least one primary pump by starting the first pressure transducer when the hydraulic fluid within the control system drops to at least the first pressure below the predetermined static pressure;

pumping hydraulic fluid from the tank into hydraulic lines of the control system using the at least one primary pump; and stopping the first pressure transducer when the hydraulic fluid within the control system returns to the predetermined static pressure.

15. The method of claim 14, further comprising stopping the pumping step a predetermined time after the hydraulic fluid within the control system returns to the predetermined static pressure.

16. The method of claim 14, further comprising venting hydraulic fluid into the tank when the hydraulic fluid within the control system exceeds the predetermined static pressure.

17. The method of claim 14, further comprising starting the pneumatic pump by starting the second pressure transducer when the hydraulic fluid within the control system drops to at least the second pressure below the predetermined static pressure.

18. The method of claim 14, further comprising regulating the pressure of the hydraulic energy applied to the component of the hydraulic device to control the function of the hydraulic device.

19. The method of claim 14, wherein the hydraulic device is a pressure control equipment.

20. A method comprising:

operatively connecting the control system of claim 8 to a hydraulic device;

opening at least one valve of the plurality of valves;

applying hydraulic energy to a component of the hydraulic device through the at least one open valve to control a function of the hydraulic device;

starting the at least one primary pump by starting the first pressure transducer when the hydraulic fluid within the control system drops to at least the first pressure below the predetermined static pressure;

pumping hydraulic fluid from the tank into hydraulic lines of the control system using the at least one primary pump; and stopping the first pressure transducer when the hydraulic fluid within the control system returns to the predetermined static pressure.

* * * * *